(12) United States Patent
Jordan et al.

(10) Patent No.: US 12,347,426 B2
(45) Date of Patent: Jul. 1, 2025

(54) COMPUTER-BASED SYSTEMS UTILIZING SPEECH PATTERN RECOGNITION MACHINE LEARNING MODELS AND METHODS OF USE THEREOF

(71) Applicant: Capital One Services, LLC, McLean, VA (US)

(72) Inventors: Stephen L. Jordan, Burke, VA (US); Sean Easter, Mahtomedi, MN (US)

(73) Assignee: Capital One Services, LLC, McLean, VA (US)

( * ) Notice: Subject to any disclaimer, the term of this patent is extended or adjusted under 35 U.S.C. 154(b) by 278 days.

(21) Appl. No.: 17/967,736

(22) Filed: Oct. 17, 2022

(65) Prior Publication Data

US 2024/0127806 A1 Apr. 18, 2024

(51) Int. Cl.
*G10L 15/00* (2013.01)
*G06F 40/166* (2020.01)
(Continued)

(52) U.S. Cl.
CPC .......... *G10L 15/197* (2013.01); *G06F 40/166* (2020.01); *G06F 40/284* (2020.01);
(Continued)

(58) Field of Classification Search
CPC .......... G06F 40/30; G06F 40/00; G06F 40/10; G06F 40/35; G06F 16/332;
(Continued)

(56) References Cited

U.S. PATENT DOCUMENTS 9,633,203 B2 4/2017 Sanjeev et al.
10,497,361 B1 * 12/2019 Rule ................. G10L 25/48
(Continued)

FOREIGN PATENT DOCUMENTS

WO 2020/171725 A1 2/2019

OTHER PUBLICATIONS

Seo, M., Kwiatkowski, T., Parikh, A. P., Farhadi, A., & Hajishirzi, H. (2018). Phrase-indexed question answering: A new challenge for scalable document comprehension. arXiv preprint arXiv:1804.07726. (Year: 2018).*

*Primary Examiner* — Edgar X Guerra-Erazo
(74) *Attorney, Agent, or Firm* — Greenberg Traurig, LLP

(57) ABSTRACT

A method receiving at least one transcribed speech file of at least one person; identifying a plurality of utterance-delimited multiword units in the at least one transcribed speech file; generating a plurality of utterance-based data vectors corresponding to the plurality of utterance-delimited multiword units by assigning a numerical data token to each word in each utterance-delimited multiword unit; determining at least one utterance-delimited multiword unit from the plurality of utterance-delimited multiword units having question-indicative word patterns by inputting the plurality of utterance-based data vectors into at least one machine learning model, configured to identify the question-indicative word patterns by computing a probability of a word or groups of words in each of the plurality of utterance-delimited multiword units; and identifying at least one question in the at least one transcribed speech file of the speech of the at least one person using the question-indicative word patterns.

20 Claims, 9 Drawing Sheets

(51) Int. Cl.
  G06F 40/284 (2020.01)
  G06N 3/044 (2023.01)
  G06N 3/08 (2023.01)
  G10L 15/06 (2013.01)
  G10L 15/16 (2006.01)
  G10L 15/197 (2013.01)
  G10L 15/22 (2006.01)
(52) U.S. Cl.
  CPC ............... G06N 3/044 (2023.01); G06N 3/08 (2013.01); G10L 15/063 (2013.01); G10L 15/16 (2013.01); G10L 15/22 (2013.01)
(58) Field of Classification Search
  CPC .. G06F 16/3329; G06F 40/205; G06F 40/289; G06N 3/044; G06N 3/02; G06N 3/042; G06N 3/043; G06N 3/0442; G06N 3/0455; G06N 3/045; G06N 3/0464; G06N 3/047; G06N 3/0475; G06N 3/048; G06N 3/0499; G06N 3/08; G06N 3/088; G06N 3/0895; G06N 3/09; G06N 3/091; G06N 3/092; G06N 3/094; G06N 3/096; G06N 3/098; G06N 3/0985; G06N 20/20; G06N 20/10; G06N 20/00; G10L 15/1822; G10L 15/00; G10L 15/02; G10L 15/04; G10L 15/05; G10L 15/063; G10L 15/075; G10L 15/07; G10L 15/065; G10L 2015/0633; G10L 2015/0631; G10L 15/08; G10L 15/083; G10L 2015/086; G10L 2015/088; G10L 15/16; G10L 15/18; G10L 15/1815; G10L 15/1807; G10L 15/187; G10L 15/193; G10L 15/197; G10L 15/19; G10L 15/22; G10L 2015/221; G10L 15/222; G10L 2015/223; G10L 2015/225; G10L 15/26; G10L 15/30; G10L 15/32; G10L 15/34; G10L 17/02; G10L 17/20; G10L 17/22; H04L 51/02

See application file for complete search history.

(56) References Cited

U.S. PATENT DOCUMENTS

| | | |
|---|---|---|
| 11,182,045 B2 | 11/2021 | Johari |
| 11,374,882 B2* | 6/2022 | Cress ................. G06F 40/284 |
| 11,380,305 B2* | 7/2022 | Rajagopal ............. G10L 15/08 |
| 11,423,066 B2* | 8/2022 | Ganu ................. G06F 16/3329 |
| 11,461,613 B2* | 10/2022 | Perez ................. G06F 16/3329 |
| 2007/0047523 A1 | 3/2007 | Jiang |
| 2010/0161734 A1 | 6/2010 | Wang |
| 2014/0195972 A1 | 7/2014 | Lee et al. |
| 2017/0206889 A1* | 7/2017 | Lev-Tov ................ G10L 15/26 |
| 2017/0270912 A1* | 9/2017 | Levit ..................... G10L 15/10 |
| 2020/0285702 A1* | 9/2020 | Padhi ..................... G06N 3/08 |
| 2021/0174161 A1* | 6/2021 | Perez ..................... G06F 16/93 |
| 2022/0124056 A1* | 4/2022 | Cress ................... G06F 18/22 |
| 2023/0385558 A1* | 11/2023 | Oh ......................... G06F 16/35 |

* cited by examiner

202 { Speaker 1: Hello, this is John Smith. I hold three accounts with your financial institution. A loan account, a credit card account, and a bank account. Can you help me to get me some information on these accounts?

204 {
Speaker 2: How can I help you, Mister Smith?

Speaker 1: My computer crashed, and I cannot get into my account. First, can you help me with my loan account?

Speaker 2: Sure. What is your loan account number or social security number?

Speaker 1: 45-A56126

Speaker 2: OK for security, what is the value of your loan?

Speaker 1: One hundred thousand, five hundred and thirty-one dollars.

Speaker 2: Thanks. How can I help you?

Speaker 1: In that my computer crashed, can you please tell me the value of this month's loan payment and due date as well as what means in the absence of account access that I transfer money to pay the loan?

Speaker 2: Can you tell me the bank account you have set up in your profile?

Speaker 1: Yes, XYZ Banker's Trust.

Speaker 2: Your current loan payment is $1567. Would you like me to authorize an ACH transfer to pay the loan payment?

Speaker 1: Yes, please.

Speaker 2: OK, the transfer request has been completed. How else can I help you?

Speaker 1: Does XYZ Banker's Trust have a mobile device app?

Speaker 2: Yes. we do? What kind of mobile device do you have – an Apple or Android?

Speaker 1: An Android device.

Speaker 2: Would you like instructions how to download the app?

Speaker 1: Yes

Speaker 2: Please go to the App Store for your android device and download the XYZ Banker's Trust. This will give you access to your accounts from your mobile device.

Speaker 1: Thanks so much for your help.

FIG. 2

206 hello, this is john smith    i hold three accounts with your financial institution    a loan account a credit card account and a bank account    can you help me to get me some information on these accounts   how can i help you mister smith   my computer crashed and i cannot get into my account    First    can you help me with my loan account    sure   what is your loan account number or social security number    45-A56126    ok    for security   what is the value of your loan    one hundred thousand five hundred and thirty-one dollars    Thanks    how can i help you    in that my computer crashed   can you please tell me the value of this months loan payment and due date as well as what means in the absence of account access that i transfer money to pay the loan    can you tell me the bank account you have set up in your profile    yes    xyz banker's trust    your current loan payment is 1567 dollars    would you like me to authorize an ach transfer to pay the loan payment    yes please    ok the transfer request has been completed    how else can i help you    does xyz bankers trust have a mobile device app    yes we do    what kind of mobile device do you have an apple or android    an android device would you like instructions how to download the app    yes    please go to the app store for your android device and download the xyz bankers trust    this will give you access to your accounts from your mobile device    thanks so much for your help    anything else to help you with

Can you help me to get me some information on these accounts?

How can I help you, Mr. Smith?

First, can you help me with my loan account?

What is your loan account number or social security number?

OK for security, what is the value of your loan?

How can I help you?

Can you please tell me the value of this month's loan payment and due date as well as what means in the absence of account access that I transfer money to pay the loan?

Can you tell me the bank account you have set up in your profile?

Would you like me to authorize an ACH transfer to pay the loan payment?

How else can I help you?

Does XYZ Banker's Trust have a mobile device app?

What kind of mobile device do you have – an Apple or Android?

Would you like instructions how to download the app?

Anything else to help you with?

FIG. 4

COMPUTER-BASED SYSTEMS UTILIZING SPEECH PATTERN RECOGNITION MACHINE LEARNING MODELS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based systems utilizing speech pattern recognition machine learning models and methods of use thereof.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based system/method/that includes at least the following components/steps of receiving, by a processor, at least one transcribed speech file of speech of at least one person; identifying, by the processor, a plurality of utterance-delimited multiword units in the at least one transcribed speech file; wherein each utterance-delimited multiword unit corresponds to an identified utterance in the speech delimited by pauses in the speech of the at least one person; generating, by the processor, a plurality of utterance-based data vectors corresponding to the plurality of utterance-delimited multiword units by assigning a numerical data token to each word in each utterance-delimited multiword unit; wherein each utterance-based data vector comprises a sequence of numerical data tokens; determining, by the processor, at least one utterance-delimited multiword unit from the plurality of utterance-delimited multiword units having question-indicative word patterns by inputting the plurality of utterance-based data vectors into at least one machine learning model, configured to identify the question-indicative word patterns by computing a probability of a word, groups of words, or both in each of the plurality of utterance-delimited multiword units; and identifying, by the processor, at least one question in the at least one transcribed speech file of the speech of the at least one person using the question-indicative word patterns identified in the at least one utterance-delimited multiword unit.

In some embodiments, the present disclosure provides an exemplary technically improved computer-based system and method/that includes at least the following components and/or steps of a memory configured to store computer code; and a processor configured to execute the computer code stored in the memory that causes the processor to: receive at least one transcribed speech file of speech of at least one person; identify a plurality of utterance-delimited multiword units in the at least one transcribed speech file; wherein each utterance-delimited multiword unit corresponds to an identified utterance in the speech delimited by pauses in the speech of the at least one person; generate a plurality of utterance-based data vectors corresponding to the plurality of utterance-delimited multiword units by assigning a numerical data token to each word in each utterance-delimited multiword unit; wherein each utterance-based data vector comprises a sequence of numerical data tokens; determine at least one utterance-delimited multiword unit from the plurality of utterance-delimited multiword units having question-indicative word patterns by inputting the plurality of utterance-based data vectors into at least one machine learning model, configured to identify the question-indicative word patterns by computing a probability of a word, groups of words, or both in each of the plurality of utterance-delimited multiword units; and identify at least one question in the at least one transcribed speech file of the speech of the at least one person using the question-indicative word patterns identified in the at least one utterance-delimited multiword unit.

BRIEF DESCRIPTION OF THE DRAWINGS

Various embodiments of the present invention can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 is a diagram depicting a received audio data file between at least two people, in accordance with one or more embodiments of the present disclosure;

FIG. 3 is a diagram depicting a plurality of utterances based on the received audio data file between the at least two people, in accordance with one or more embodiments of the present disclosure;

FIG. 4 is a diagram depicting an output of a machine learning model, wherein the output is identified questions within the plurality of utterances associated with the received audio data file, in accordance with one or more embodiments of the present disclosure;

DETAILED DESCRIPTION

Figure 1:
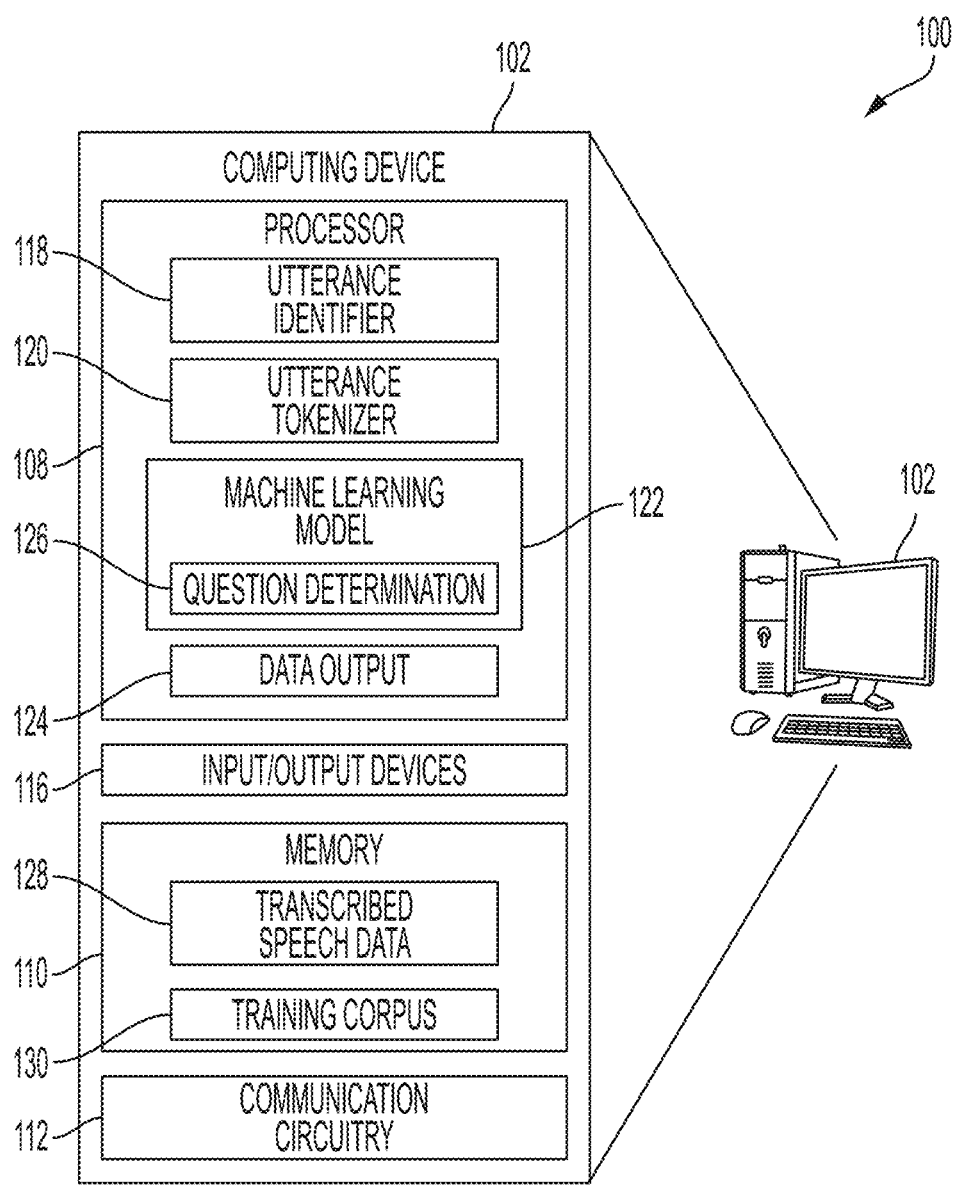
FIG. 1 is a block diagram show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

In some embodiments, an exemplary automatic speech recognition ("ASR") system of the present disclosure, utilizing at least one machine-learning model described herein, may receive an input data in form of, but not limited to, audio data/recording, transcribed input/file, having a transcription of an audio recording. In some embodiments, the text data file may not contain capital letters or punctuation, making the only distinction between groups of words in the transcription captured pauses in the text data file. Typically, the text data file may be incapable of conveying a question due to the lack of punctuation, e.g., the transcription will not display any questions because there are no question marks within the transcription. In some embodiments, an analysis of the text data file may be inefficient in determining an average number of questions associated with a type of text data file, or type of conversation for example. In some embodiments, the exemplary ASR system of the present disclosure, utilizing at least one machine-learning model described herein, increases the efficiency of practical ASR systems by determining a frequency of questions within an audio recording using a generated utterance vector based on an identified plurality of utterances within the audio recording and a dynamically trained machine learning model with a predetermined vocabulary corpus, resulting in at least more expedient processing of the transcribed speech and generating new data about the transcribed speech in more efficient manner and improved understanding that would not be otherwise available.

Embodiments of the present disclosure herein describe systems for implementing a machine learning based method to dynamically identify questions in a transcription of an audio recording (e.g., a dialogue between at least two people), where the text may be unpunctuated. In some embodiments, the exemplary ASR system of the present disclosure, utilizing at least one machine-learning model described herein, may receive an audio input/recording that the exemplary ASR system may be configured to automatically transcribe the input/recording into a text data file, which may be subsequently flattened with no capital letters and no punctuation to identify a plurality of utterances. In at least some embodiments of the present disclosure, the term "utterance" is referred to as a grouping of words within the text data file separated by pauses.

In some embodiments, the multiple groups of words corresponding to multiple utterances may be converted to sequences of numerical tokens based on a predetermined threshold of numerical tokens. For example, the predetermined threshold of numerical tokens may be a corpus of collected words, with each word directly corresponding to a specific numerical token. In some embodiments, the exemplary ASR system of the present disclosure, utilizing at least one machine-learning model described herein, may be configured to convert the plurality of utterances into numerical tokens that may become input data for a machine learning model for dynamic training of the machine learning model. In some embodiments, the exemplary ASR system of the present disclosure, utilizing at least one machine-learning model described herein, system may be configured to generate a data vector based on a plurality of numerical tokens, which may directly follow a sequence of the plurality of numerical tokens associated with the plurality of utterances. In some embodiments, the generated data vector may be the input of the machine learning model. In some embodiments, the exemplary ASR system of the present disclosure, utilizing at least one machine-learning model described herein, may be configured to determine that at least one utterance within the plurality of utterances has question-indicative word patterns by inputting a plurality of generated data vectors into at least one machine learning model, which may identify the question-indicative word patterns by computing a probability of a word, groups of words, or both in each utterance within the plurality of utterances. In some embodiments, the exemplary ASR system of the present disclosure, utilizing at least one machine-learning model described herein, may be configured to identify at least one question in the audio file/recording using the question-indicative word patterns identified in the plurality of utterances.

FIG. 1 is a block diagram of a system 100 for identifying at least one question in a transcribed audio data file in accordance with one or more embodiments of the present disclosure. The system 100 may include a computing device 102 associated with a user and a program 104 (not shown). In some embodiments, the program 104 may be stored on the computing device 102. In some embodiments, the program 104 may be stored on a server computing device 106 (not shown). In some embodiments, the computing device 102 may include a processor 108, a memory 110, a communication circuitry 112 for communicating over a communication network 114 (not shown), and input and/or output (I/O) devices 116 such as a keyboard, mouse, a touchscreen, and/or a display, for example.

In some embodiments, the processor 108 may be configured to execute software modules such as an utterance identifier module 118, an utterance tokenizer module 120, a machine learning model 122 module, and data output module 124. The machine learning model module 122 may also store a question determination module 126. The utterance identifier module 118 identifies a plurality of utterances within a received audio data file (i.e., a transcription) from an automated speech recognition ("ASR") system. In some embodiments, the utterance identifier module 118 removes punctuation marks and capital letters within a received audio data file. The utterance tokenizer module 120 may be programmed to dynamically convert and/or translate the identified plurality of utterances within the received audio data file into a quantifiable numerical token for each identified utterance within the identified plurality of utterances associated with the received audio data file, resulting in a plurality of tokens, by, for example, without limitation utilizing a recursive neural network (RNN). In some embodiments, the utterance tokenizer module 120 dynamically embeds the identified plurality of utterances within the transcription by matching each word within each identified utterance within the identified plurality of utterances to a numerical token of the plurality of tokens, where the numerical token for each word within the identified plurality of utterances becomes the input for the machine learning model module 122. In some embodiments, the utterance identifier module 118 and the utterance tokenizer module 120 may delimit multiple words in at least one transcribed speech file. In some embodiments, the utterance tokenizer module 120 dynamically adds zeros to identified utterances to ensure that each identified utterance within the identified plurality of utterances may be the same length of words, which ensures that each identified utterance within the identified plurality of utterances has the same number of numerical tokens. In some embodiments, the utterance tokenizer module 120 generates a plurality of utterance vectors by aggregating at least two identified utterances within the identified plurality of utterances based on a predetermined selection of hyperparameters within a plurality of hyperparameters. In at least one embodiment, the exemplary ASR system of the present disclosure, utilizing at least one machine-learning model described herein, refers to the term "hyperparameter" as a factor (i.e. variable) that distinguishes at least one utterance from a second utterance. In some embodiments, each utterance vector may be associated with the predetermined selection of the identified plurality of utterances based on one or more specific categories of utterances such as type, date, location, etc. In some embodiments, each utterance vector within the plurality of utterance vectors are the input data of the machine learning model module 122. In some embodiments, the utterance tokenizer module 120 generates the plurality of utterance vectors by assigning a numerical data toke to each word in each identified utterance within the identified plurality of utterances chosen from a vocabulary dataset of a predefined number of unique numerical data tokens. In some embodiments, the question determination module 126 stored within the machine learning model module 122 identifies specific numerical tokens associated with the identified plurality of utterances that distinguishes an inquisitive statement (e.g., a question). For example, the question determination module 126 identifies numerical tokens associated with the word for "do," the word for "you," and the words "do you like." In some embodiments, the sequence of the numerical tokens modifies the determination within the question determination module 126. In some embodiments, the utterance identifier module 118 identifies a plurality of utterances within a presentation with a plurality of speakers. In some embodiments, the utterance identifier module 118 identifies a plurality of utterances within an audio recording of a conference call with at least three speakers.

In some embodiments, the machine learning model module 122 may be dynamically selected from a plurality of machine learning models. In some embodiments, the plurality of machine learning models include an artificial recurrent neural network model (RNN), a long short-term memory ("LSTM") model, and a distributed long short-term memory ("DLSTM") model. In at least one embodiment of the present disclosure, the input to the machine learning model module 122 may be an utterance data vector. In some embodiments, the selected machine learning model may modify a utilization of the plurality of hyperparameters. For example, the DLSTM model may be programmed to utilize hyperparameters based on a predetermined size associated with an internal component of the LSTM model. In yet another example, the LSTM model may be programmed to utilize at least three different values for at least three different hyperparameters, with one hyperparameter being associated with recurring words or numerical tokens. In some embodiments, the question determination module 126 within the machine learning model module 122 may be programmed to calculate a probability that a specific identified utterance within the identified plurality of utterances contains a question based on the unique sequence of numerical tokens. In some embodiments, the utilization of the question determination module 126 may be programmed to increase the accuracy and/to dynamically optimize the machine learning model module 122 using the plurality of hyperparameters. In some embodiments, the machine learning model module 122 may be programmed to output at least one question using the question determination module 126 based on the received audio data file.

In some embodiments, the data output module 124 may be programmed to instruct the computing device 102 to display at least one identified question within the received audio data file on a graphic user interface on the computing device 102. In some embodiments, the data output module 124 may generate an automated messaging response graphic user interface that provides textual answers for each identified question within the plurality of identified utterances using the question determination model 126 and the machine learning model module 122. In some embodiments, the automated messaging response graphic user interface may respond to identified questions using a plurality of prestored responses associated with a predetermined frequency of identified questions within the plurality of identified utterances. In some embodiments, the automated messaging response graphic user interface may respond to identified questions in real time. For example, the automated messaging response graphic user interface may be a chatbot that dynamically answers identified questions within the plurality of identified utterances.

In some embodiments, the memory 110 may store transcribed speech data 128 and a training corpus 130. In some embodiments, the training corpus 130 may be a predetermined collection of words. In some embodiments, the predetermined collection of words may be based at least in part on, without limitation, a specific type of dialogue between at least two people. For example, the training corpus 130 for a credit card balance communication may be different than the training corpus 130 for a rental car communication. In some embodiments, the transcribed speech data 128 may have punctuations and capital letters removed by the utterance identifier module 118. In some embodiments, the transcribed speech data 128 may be in the form of scripted lines, where each line of dialogue of at least one person may be on a separate line in sequential order. In some embodiments, the training corpus 130 may be dynamically selected from a group of corpuses such as, without limitation, a corpus of television and/or movie scripts, a corpus of dialogue extracted from written media, a corpus of punctuated human-transcription conversations, one or more similarly suitable corpuses, or any combination thereof.

For example, an illustrative corpus of movie scripts may contain a metadata-rich collection of fictional conversations extracted from raw movie scripts, including, without limitations, from 100,000 to 500,000 (e.g., over 200,000) conversational exchanges between pairs of movies (e.g., over 1,000 pairs, over 5,000 pairs, over 10,000 pairs, etc.), involving, without limitation, hundreds or thousands of characters hundreds or thousands of movies (e.g., one 100 movies, over 200 movies, over 500 movies, over 1,000 movies, etc.), over hundreds, thousands, hundreds of thousands, millions, or billions utterances (e.g., over 100,000; over 200,000; over 500,000; etc.), movie metadata may include without limitation, metrics identifying genres, release year, IMDB rating, number of IMDB votes, and/or character metadata, including, without limitation, gender and/or position on movie credits. In some embodiments, the utilizing corpuses such as the illustrative corpus of movie scripts may enables the model 122 to detect speaker-level and utterance-level information from dialogue in real-time because of one or more variations in dialect(s) of the illustrative corpus.

In some embodiments, the illustrative corpus may contain a variety of speaker-level and/or utterance-level information, where conversational participants may immediately and unconsciously adapt to each other's language styles. For example, a speaker may adjust the number of articles and other function words in their next utterance in response to the number in their partner's immediately preceding utterance. Typically, this level of coordination may be thought to have arisen to achieve social goals, such as gaining approval and/or emphasizing the difference in status. Typically, fictional dialogs may offer a way to study a particular question since authors may create the conversations but don't receive the social benefits (instead, the imagined characters may do).

FIG. 2 is a diagram 200 of a received audio data file between at least two speakers, in accordance with at least one embodiment of the present disclosure. In some embodiments, diagram 200 may be the transcribed speech data 128 stored within the memory 110 located on the computing device 102. In some embodiments, a first speaker 202 initiates a dialogue with a second speaker 204, and this dialogue may be transcribed within an ASR system, which may be programmed to record a vocal conversation using a plurality of speaker devices and convert (e.g., transcribe) the recorded speech into a text data file. For example, the first speaker 202 may discuss the status of three banking accounts with the second speaker 204, wherein each line of speech from a different speaker may be on a separate line in the transcription of the dialogue.

FIG. 3 is a diagram 206 of a plurality of identified utterances within the received audio data file, in accordance with at least one embodiment of the present invention. In some embodiments, the utterance identifier module 118 identifies a plurality of utterances within the transcribed speech data 128. In some embodiments, the utterance identifier module 118 may be programmed to remove punctuation and/or capital letters from the transcribed speech data 128. In some embodiments, each utterance within the identified plurality of utterances identified by the utterance identifier module 118 may be separated from another utterance based on a delimited pause in speech.

FIG. 4 is a diagram 208 of an output data file associated with the machine learning model module 122, in accordance with at least one embodiment of the present disclosure. In some embodiments, the output data file may be based on the utterance tokenizer module 120 being applied to the identified plurality of utterances within the received audio data file. In some embodiments and in response to the utterance tokenizer module 120 converting each word within each identified utterance into a numerical token, the question determination module 126 located within the machine learning model module 122 generates the output data file by identifying at least one specific sequence of numerical tokens associated with the identified plurality of utterances and selecting the at least one identified sequence of numerical tokens as the output data file, wherein the output data file may be at least one question identified within the received audio data file. In some embodiments, the question determination 126 module may be programmed to determine that a specific sequence of numerical tokens is a question by identifying key numerical tokens within the input of the machine learning model 122 module based on the utterance tokenizer module 120, being programmed, without limitation, to dynamically convert and/or translate the identified plurality of utterances within the received audio data file into a quantifiable numerical token for each identified utterance within the identified plurality of utterances associated with the received audio data file, resulting in a plurality of tokens. In some embodiments, the question determination 126 module may be programmed to generate a plurality of identified questions associated with the identified plurality of utterances by matching specific numerical tokens associated with questions identified within the identified plurality of utterances and at least one training corpus 130 using the artificial intelligence algorithm (e.g., RNN), as detailed herein, to dynamically embed the identified plurality of utterances within the transcription by matching each word within each identified utterance within the identified plurality of utterances to a numerical token of the plurality of tokens, where the numerical token for each word within the identified plurality of utterances becomes the input for the machine learning model module 122. In some embodiments, the output data file, as seen in FIG. 4, are the plurality of questions identified within the identified plurality of utterances associated with the retrieved audio data file, wherein the output data file displays each identified question on a separate line in sequential order proportional to the received audio data file.

Figure 5:
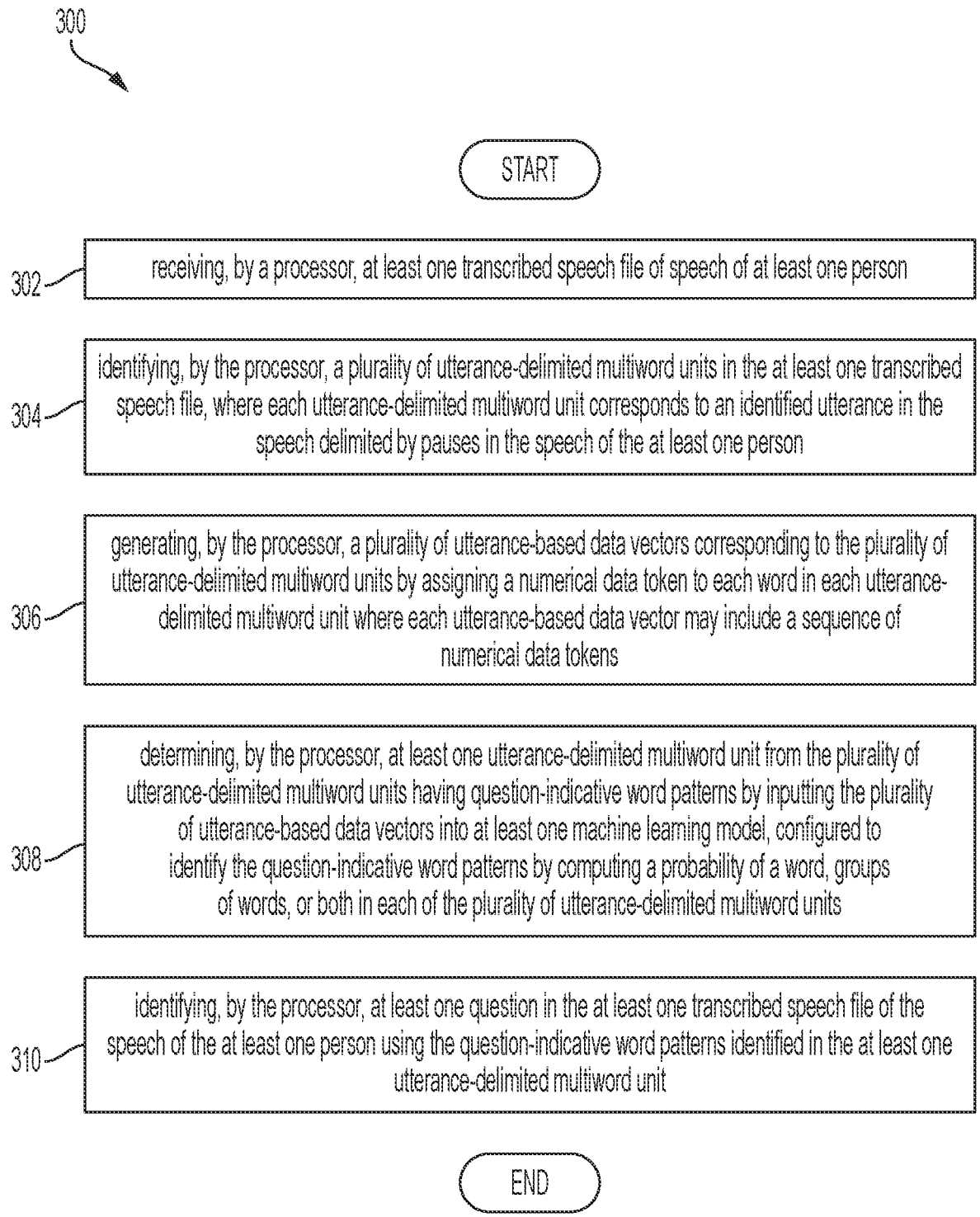
FIG. 5 is a flowchart illustrating operational steps for identifying at least one question in a transcribed speech file of at least one person using a question-indicative word pattern identified in at least one utterance-delimited multiword unit, in accordance with one or more embodiments of the present disclosure.

FIG. 5 is a flowchart 300 illustrating operational steps for identifying at least one question in the at least one transcribed speech file, in accordance with at least one embodiment of the present disclosure.

In step 302, the computing device 102 may be programmed to receive at least one transcribed speech file of speech of at least one person. In some embodiments, the machine learning model 122 module directly receives the at least one transcribed speech file of speech while stored in the computing device 102.

In step 304, the utterance identifier module 118 may be programmed to identify a plurality of utterance-delimited multiword units in the at least one transcribed speech file. In some embodiments, the utterance identifier 118 module ensures that each utterance-delimited multiword unit corresponds to an identified utterance in the speech delimited by pauses in the speech of the at least one person.

In step 306, the utterance tokenizer module 120 generates a plurality of utterance-based data vectors corresponding to the plurality of utterance-delimited multiword units. In some embodiments, the utterance tokenizer module 120 generates the plurality of utterance-based data vectors by assigning a numerical data token to each word in each utterance-delimited multiword unit. In some embodiments, each utterance-based data vector may include a sequence of numerical data tokens.

In step 308, the question determination 126 module located within the machine learning model 122 module determines at least one utterance-delimited multiword unit from the plurality of utterance-delimited multiword units having question-indicative word patterns. In some embodiments, the question determination 126 module determines the at least one utterance-delimited multiword unit from the plurality of utterance-delimited multiword units having question-indicative word patterns by inputting the plurality of utterance-based data vectors into at least one machine learning model. In this embodiment and in response to inputting the plurality of utterance-based data vectors into the at least one machine learning model, the question determination 126 module identifies the question-indicative word pattern by computing a probability of a word, groups of words, or both in each of the plurality of utterance-delimited multiword units.

In step 310, the output data 124 module identifies at least one question in the at least one transcribed speech file of the speech of the at least one person. In some embodiments, the output data 124 module located on the processor 108 associated with the computing device 102 identifies the at least one question in the at least one transcribed speech file of the speech by using the question-indicative word patterns identified in the at least one utterance-delimited multiword unit.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store audio recordings, transcriptions, generated utterance vectors, and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent transcriptions/users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the exemplary inventive computer-based systems/platforms, the exemplary inventive computer-based devices, and/or the exemplary inventive computer-based components of the present disclosure may be configured to securely store and/or transmit data (e.g., speech transcription files, tokenized vectors, etc.) by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
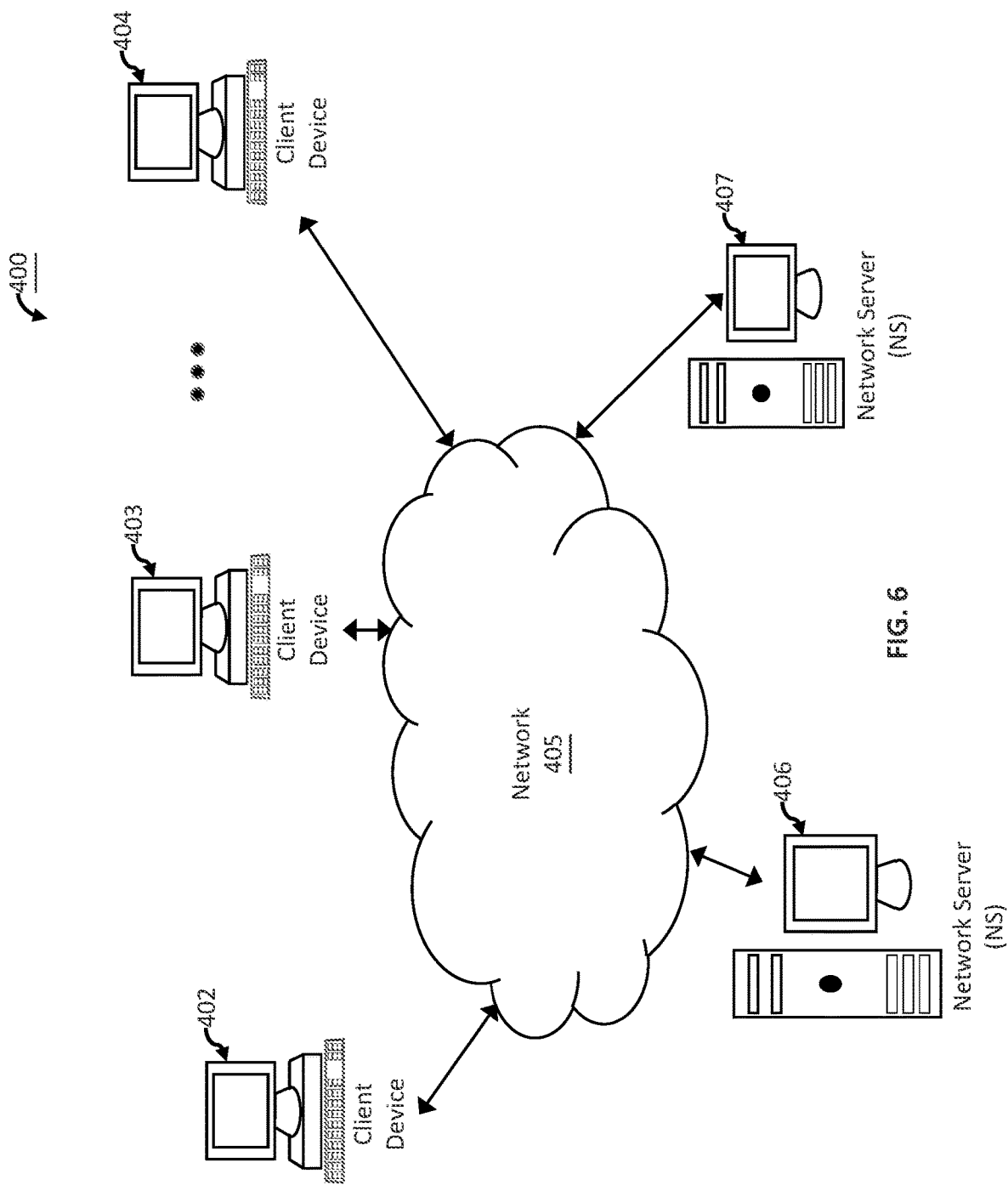
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transcriptions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary ASR system of the present disclosure, utilizing at least one machine-learning model described herein.

In some embodiments, referring to FIG. 6, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 402-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information (e.g., an audio recording, a transcription, vectors, tokens, etc.) using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
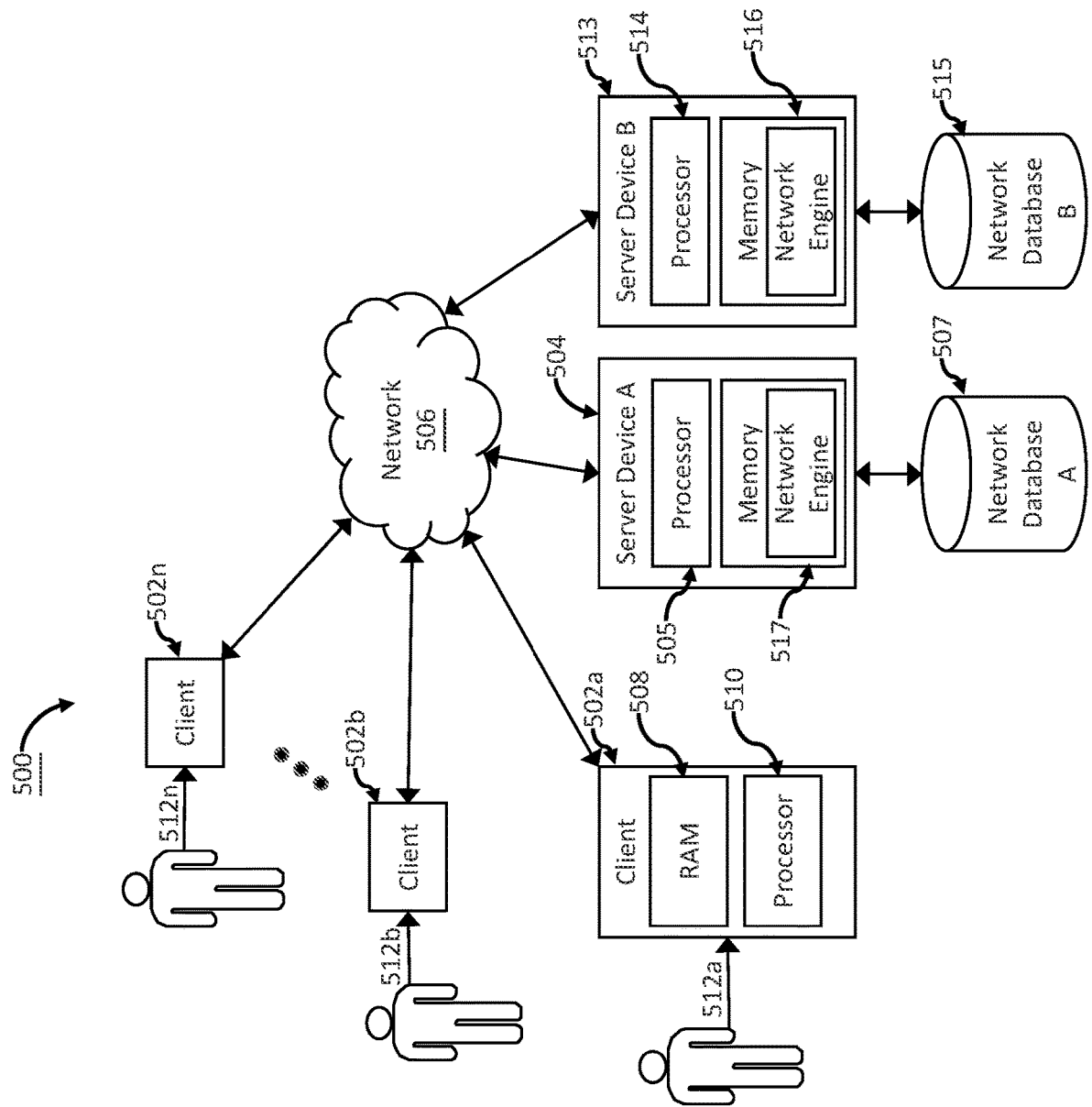
FIG. 7 depicts a block diagram of another exemplary computer-based system/platform in accordance with one or more embodiments of the present disclosure.
Figure 8:
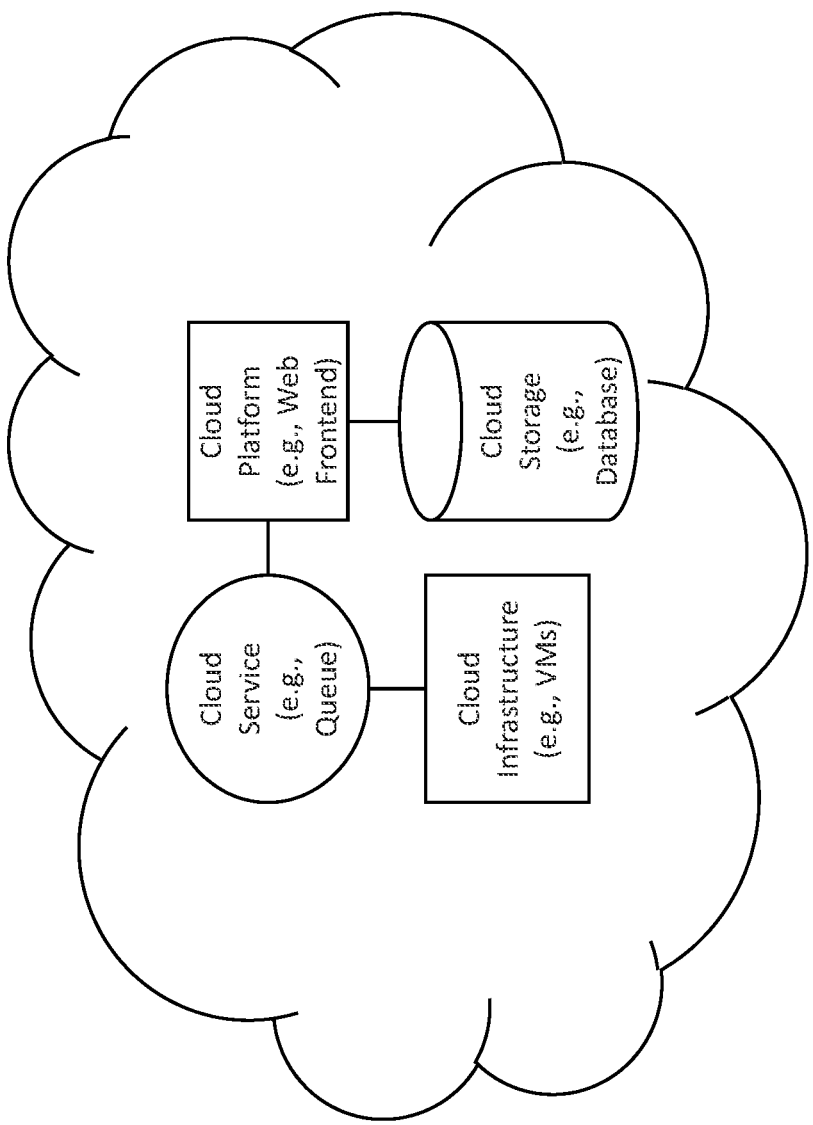
FIGS. 8 and 9 are diagrams illustrating implementations of cloud computing architecture/aspects with respect to which the disclosed technology may be specifically configured to operate, in accordance with one or more embodiments of the present disclosure.
Figure 9:
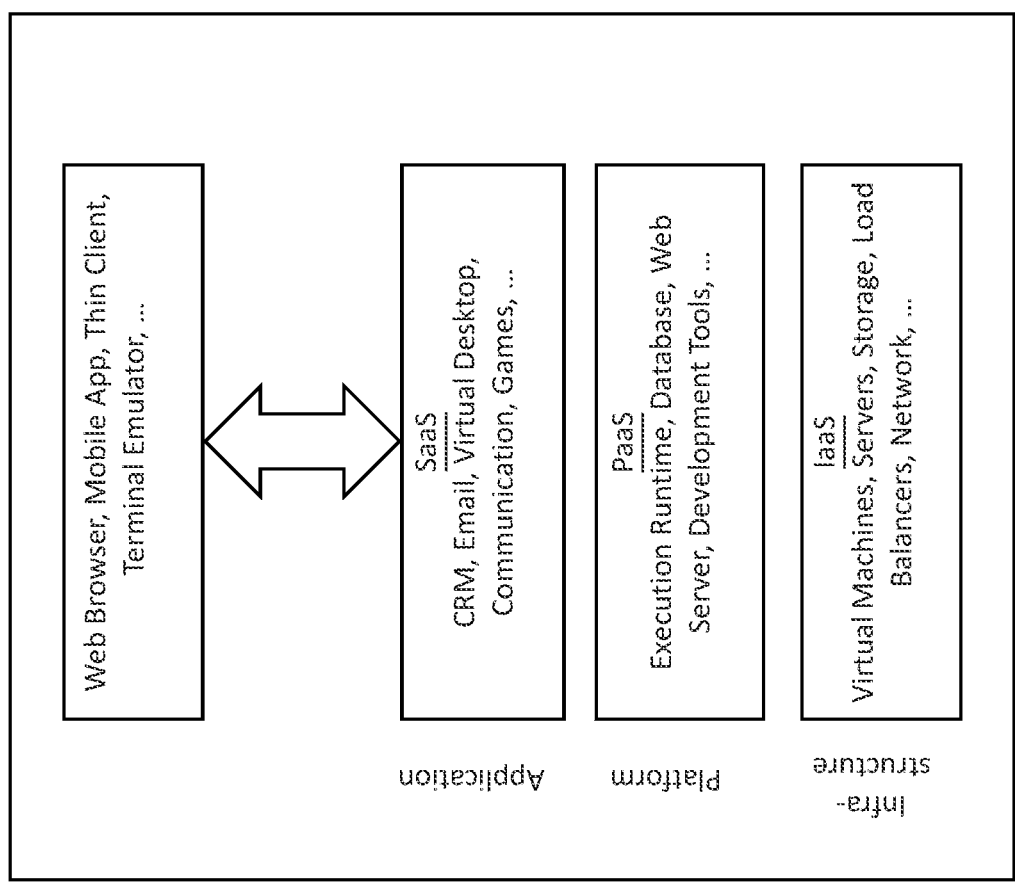

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 7, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/ architecture such as, but not limiting to: infrastructure a service (IaaS) 710, platform as a service (PaaS) 708, and/or software as a service (SaaS) 706.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, an artificial recurrent neural network model ("RNN"), a long short-term memory ("LSTM") model, and a distributed long short-term memory ("DLSTM") model, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
   i) Define Neural Network architecture/model,
   ii) Transfer the input data to the exemplary neural network model,
   iii) Train the exemplary model incrementally,
   iv) determine the accuracy for a specific number of timesteps,
   v) apply the exemplary trained model to process the newly-received input data,
   vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

Clause 1, an embodiment may provide a method that may include: receiving, by a processor, at least one transcribed speech file of speech of at least one person; identifying, by the processor, a plurality of utterance-delimited multiword units in the at least one transcribed speech file; where each utterance-delimited multiword unit corresponds to an identified utterance in the speech delimited by pauses in the speech of the at least one person; generating, by the processor, a plurality of utterance-based data vectors corresponding to the plurality of utterance-delimited multiword units by assigning a numerical data token to each word in each utterance-delimited multiword unit; where each utterance-based data vector comprises a sequence of numerical data tokens; determining, by the processor, at least one utterance-delimited multiword unit from the plurality of utterance-delimited multiword units having question-indicative word patterns by inputting the plurality of utterance-based data vectors into at least one machine learning model, configured to identify the question-indicative word patterns by computing a probability of a word, groups of words, or both in each of the plurality of utterance-delimited multiword units; and identifying, by the processor, at least one question in the at least one transcribed speech file of the speech of the at least one person using the question-indicative word patterns identified in the at least one utterance-delimited multiword unit.

Clause 2, the method according to clause 1, where the receiving of the at least one transcribed speech file comprises removing punctuation marks and capital letters in the at least one transcribed speech file.

Clause 3, the method according to clause 1 or 2, where the receiving of the at least one transcribed speech file comprises receiving a transcription of an audio file from an automated speech recognition system.

Clause 4, the method according to clause 1, 2, or 3, further comprising training, by the processor, the at least one machine learning model using a corpus of transcribed conversation with questions to identify the question-indicative word patterns.

Clause 5, the method according to clause 4, where the corpus comprises at least one of: a Cornell Movie-Dialogs corpus, a corpus of television scripts, dialogue extracted from books, dialogue extracted from written media, and punctuated human-transcribed conversations.

Clause 6, the method according to clause 4 or 5, further comprising training, by the processor, the at least one machine learning model using hyperparameter optimization.

Clause 7, the method of clause 1, 2, 3, or 4, where each utterance-based data vector comprises a predefined number of numerical data tokens.

Clause 8, the method according to clause 1, 2, 3, 4, or 7, where the at least one machine learning model comprises at least one of: an artificial recurrent neural network model, a long short-term memory (LSTM) model, and a distributed long short-term memory (DLSTM) model.

Clause 9, the method according to clause 1, 2, 3, 4, 7, or 8, where the generating the plurality of utterance-based data vectors corresponding to the plurality of utterance-delimited multiword units comprises assigning the numerical data token to each word in each utterance-delimited multiword unit chosen from a vocabulary dataset of a predefined number of unique numerical data tokens.

Clause 10, the method according to clause 1, 2, 3, 4, 7, 8, or 9, further comprising outputting, by the processor, the at least one question in the at least one transcribed speech file in an output data file.

Clause 11, an embodiment may provide a system may include at least one non-transitory memory and at least one processor. The at least one processor may be configured to execute a code that is stored in the at least one non-transitory memory that causes the at least one processor to: receive at least one transcribed speech file of speech of at least one person; identify a plurality of utterance-delimited multiword units in the at least one transcribed speech file; where each utterance-delimited multiword unit corresponds to an identified utterance in the speech delimited by pauses in the speech of the at least one person; generate a plurality of utterance-based data vectors corresponding to the plurality of utterance-delimited multiword units by assigning a numerical data token to each word in each utterance-delimited multiword unit; where each utterance-based data vector comprises a sequence of numerical data tokens; determine at least one utterance-delimited multiword unit from the plurality of utterance-delimited multiword units having question-indicative word patterns by inputting the plurality of utterance-based data vectors into at least one machine learning model, configured to identify the question-indicative word patterns by computing a probability of a word, groups of words, or both in each of the plurality of utterance-delimited multiword units; and identify at least one question in the at least one transcribed speech file of the speech of the at least one person using the question-indicative word patterns identified in the at least one utterance-delimited multiword unit.

Clause 12, the system according to clause 11, where the processor is configured to receive the at least one transcribed speech file by removing punctuation marks and capital letters in the at least one transcribed speech file.

Clause 13, the system according to clause 11 or 12, where the processor is configured to receive the at least one transcribed speech file by receiving a transcription of an audio file from an automated speech recognition system.

Clause 14, the system according to clause 11, 12, or 13, where the processor is further configured to train the at least one machine learning model using a corpus of transcribed conversation with questions to identify the question-indicative word patterns.

Clause 15, the system according to clause 14, where the corpus comprises at least one of: a Cornell Movie-Dialogs corpus, a corpus of television scripts, dialogue extracted from books, dialogue extracted from written media, and punctuated human-transcribed conversations.

Clause 16, the system according to clause 11, 12, 13, or 14, where the processor is further configured to train the at least one machine learning model using hyperparameter optimization.

Clause 17, the system according to clause 11, 12, 13, 14, or 16, where each utterance-based data vector comprises a predefined number of numerical data tokens.

Clause 18, the system according to clause 11, 12, 13, 14, 16, or 17, where the at least one machine learning model comprises at least one of: of an artificial recurrent neural network model, a long short-term memory (LSTM) model, and a distributed long short-term memory (DLSTM) model.

Clause 19, the system according to clause 11, 12, 13, 14, 16, 17, or 18, where the processor is configured to generate the plurality of utterance-based data vectors corresponding to the plurality of utterance-delimited multiword units by assigning the numerical data token to each word in each utterance-delimited multiword unit chosen from a vocabulary dataset of a predefined number of unique numerical data tokens.

Clause 20, the system according to clause 11, 12, 13, 14, 16, 16, 18, or 19, where the processor is further configured output the at least one question in the at least one transcribed speech file in an output data file.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method, comprising:
   receiving, by a processor, at least one transcribed speech file of speech of at least one person;
   identifying, by the processor, a plurality of utterance-delimited multiword units in the at least one transcribed speech file;
      wherein each utterance-delimited multiword unit corresponds to an identified utterance in the speech delimited by pauses in the speech of the at least one person;
   generating, by the processor, a plurality of utterance-based data vectors corresponding to the plurality of utterance-delimited multiword units by assigning a numerical data token to each word in each utterance-delimited multiword unit;
      wherein each utterance-based data vector comprises a sequence of numerical data tokens;
   determining, by the processor, at least one utterance-delimited multiword unit from the plurality of utterance-delimited multiword units having question-indicative word patterns by inputting the plurality of utterance-based data vectors into at least one machine learning model, trained to output a probability that a word, groups of words, or both in each of the plurality of utterance-delimited multiword units comprises the question-indicative word patterns; and
   identifying, by the processor, at least one question in the at least one transcribed speech file of the speech of the at least one person based at least in part on:
      the probability and
      the question-indicative word patterns identified in the at least one utterance-delimited multiword unit.

2. The method according to claim 1, wherein the receiving of the at least one transcribed speech file comprises removing punctuation marks and capital letters in the at least one transcribed speech file.

3. The method according to claim 1, wherein the receiving of the at least one transcribed speech file comprises receiving a transcription of an audio file from an automated speech recognition system.

4. The method according to claim 1, further comprising training, by the processor, the at least one machine learning model using a corpus of transcribed conversation with questions to identify the question-indicative word patterns.

5. The method according to claim 4, wherein the corpus comprises at least one of: a Cornell Movie-Dialogs corpus, a corpus of television scripts, dialogue extracted from books, dialogue extracted from written media, and punctuated human-transcribed conversations.

6. The method according to claim 4, further comprising training, by the processor, the at least one machine learning model using hyperparameter optimization.

7. The method of claim 1, wherein each utterance-based data vector comprises a predefined number of numerical data tokens.

8. The method according to claim 1, wherein the at least one machine learning model comprises at least one of: an artificial recurrent neural network model, a long short-term memory (LSTM) model, and a distributed long short-term memory (DLSTM) model.

9. The method according to claim 1, wherein the generating the plurality of utterance-based data vectors corresponding to the plurality of utterance-delimited multiword units comprises assigning the numerical data token to each word in each utterance-delimited multiword unit chosen from a vocabulary dataset of a predefined number of unique numerical data tokens.

10. The method according to claim 1, further comprising outputting, by the processor, the at least one question in the at least one transcribed speech file in an output data file.

11. A system, comprising:
a memory configured to store computer code; and
a processor configured to execute the computer code stored in the memory that causes the processor to:
  receive at least one transcribed speech file of speech of at least one person;
  identify a plurality of utterance-delimited multiword units in the at least one transcribed speech file;
    wherein each utterance-delimited multiword unit corresponds to an identified utterance in the speech delimited by pauses in the speech of the at least one person;
  generate a plurality of utterance-based data vectors corresponding to the plurality of utterance-delimited multiword units by assigning a numerical data token to each word in each utterance-delimited multiword unit;
    wherein each utterance-based data vector comprises a sequence of numerical data tokens;
  determine that at least one utterance-delimited multiword unit from the plurality of utterance-delimited multiword units having question-indicative word patterns by inputting the plurality of utterance-based data vectors into at least one machine learning model, trained to output a probability that a word, groups of words, or both in each of the plurality of utterance-delimited multiword units comprises the question-indicative word patterns; and
  identify, based on the probability, at least one question in the at least one transcribed speech file of the speech of the at least one person based at least in part on:
    the probability, and
    the question-indicative word patterns identified in the at least one utterance-delimited multiword unit.

12. The system according to claim 11, wherein the processor is configured to receive the at least one transcribed speech file by removing punctuation marks and capital letters in the at least one transcribed speech file.

13. The system according to claim 11, wherein the processor is configured to receive the at least one transcribed speech file by receiving a transcription of an audio file from an automated speech recognition system.

14. The system according to claim 11, wherein the processor is further configured to train the at least one machine learning model using a corpus of transcribed conversation with questions to identify the question-indicative word patterns.

15. The system according to claim 14, wherein the corpus comprising at least one of: a Cornell Movie-Dialogs corpus, a corpus of television scripts, dialogue extracted from books, dialogue extracted from written media, and punctuated human-transcribed conversations.

16. The system according to claim 11, wherein the processor is further configured to train the at least one machine learning model using hyperparameter optimization.

17. The system according to claim 11, wherein each utterance-based data vector comprises a predefined number of numerical data tokens.

18. The system according to claim 11, wherein the at least one machine learning model comprising at least one of: an artificial recurrent neural network model, a long short-term memory (LSTM) model, and a distributed long short-term memory (DLSTM) model.

19. The system according to claim 11, wherein the processor is configured to generate the plurality of utterance-based data vectors corresponding to the plurality of utterance-delimited multiword units by assigning the numerical data token to each word in each utterance-delimited multiword unit chosen from a vocabulary dataset of a predefined number of unique numerical data tokens.

20. The system according to claim 11, wherein the processor is further configured output the at least one question in the at least one transcribed speech file in an output data file.

* * * * *